United States Patent
Do et al.

(10) Patent No.: US 12,322,013 B2
(45) Date of Patent: Jun. 3, 2025

(54) IMAGE MANIPULATION DEVICE AND METHOD FOR CONTROLLING THE SAME

(71) Applicant: LG ELECTRONICS INC., Seoul (KR)

(72) Inventors: Hoseok Do, Seoul (KR); Eunkyung Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 262 days.

(21) Appl. No.: 18/304,580

(22) Filed: Apr. 21, 2023

(65) Prior Publication Data

US 2023/0343008 A1    Oct. 26, 2023

(30) Foreign Application Priority Data

Apr. 22, 2022    (KR) .................. 10-2022-0050441
Apr. 12, 2023    (KR) .................. 10-2023-0048355

(51) Int. Cl.
*G06T 11/60*    (2006.01)
*G06V 10/764*    (2022.01)

(52) U.S. Cl.
CPC ............ *G06T 11/60* (2013.01); *G06V 10/764* (2022.01)

(58) Field of Classification Search
CPC ...... G06T 11/60; G06V 10/764; G06V 10/82; G06V 40/16
See application file for complete search history.

(56) References Cited

U.S. PATENT DOCUMENTS 11,341,699 B1 *    5/2022    Gottlieb ................. G06N 3/047
2020/0356591 A1 *    11/2020    Yada .................... G06F 3/04855

* cited by examiner

*Primary Examiner* — Said Broome
*Assistant Examiner* — Andrew Shin
(74) *Attorney, Agent, or Firm* — Birch, Stewart, Kolasch & Birch, LLP (57) ABSTRACT

An image manipulation device including an interface configured to receive an image; an encoder configured to transform the received image into a vector Ws; a quantifier configured to output a source quantitative value Qs for the received image based on a training data set including a plurality of images arranged into classes, and receive a target quantitative value Qt different than the source quantitative value Qs; a navigator configured to receive the source quantitative value Qs, target quantitative value Qt and the vector Ws, and output a vector Wt indicating a modified vector of the vector Ws based on the source quantitative value Qs and target quantitative value Qt; a decoder configured to decode the output vector Wt into a modified image It corresponding to a modification of the received image; and a display configured to display the modified image.

18 Claims, 8 Drawing Sheets

(a) ATTRIBUTE : AGE

(b) ATTRIBUTE : HAPPINESS (c) ATTRIBUTE : SADNESS

IMAGE MANIPULATION DEVICE AND METHOD FOR CONTROLLING THE SAME

CROSS-REFERENCE TO RELATED APPLICATION

Pursuant to 35 U.S.C. § 119(a), this application claims priority to Korean Patent Applications No. 10-2022-0050441, filed on Apr. 22, 2022, and No. 10-2023-0048355, filed on Apr. 12, 2023, the entire contents of which are hereby expressly incorporated by reference into the present application.

BACKGROUND OF THE DISCLOSURE

Field

This disclosure relates to an image manipulation device and a method for controlling the same.

Discussion of the Related Art

Image manipulation in a latent space of a generative adversarial networks (GAN) has been extensively studied for several years. For example, StyleGAN2 is a dominant technique used due to its flexibility to represent different styles and disentangled latent spaces.

Recently, a GAN model for image synthesis using neural rendering has gained popularity. For instance, models equipped with a StyleGAN2 module can generate photo-realistic images with a variety of attributes. Nevertheless, these previous models do not sufficiently explore a fine-grained manipulation of custom attributes of objects (e.g., capturing tiredness in a face consisting of multiple and complex facial expressions).

Although there have been some attempts to use latent spaces generated by the GAN model to manipulate generated images and real images, it is difficult to implement an optimal manipulation scale according to a user's attention. Although GAN techniques have been successfully applied to rendering of photo-realistic images having a variety of attributes, there has been little research on how to fine-control images without limiting the images to a particular category of attributes.

SUMMARY OF THE DISCLOSURE

Therefore, the present disclosure is directed to addressing the aforementioned problems and other drawbacks, and is directed to an image manipulation device and method capable of finely controlling attributes to be manipulated when an image is manipulated.

In order to achieve these and other advantages and in accordance with the purpose of this specification, as embodied and broadly described herein, there is provided an image manipulation device including a quantifier configured to determine a conversion degree of an attribute of a received image; and a navigator configured to generate a manipulated image by converting the attribute of the received image on a basis of the conversion degree of the attribute, the conversion degree being determined by the quantifier, wherein the navigator performs exploration in a latent space of an image generative artificial intelligence (AI) model to convert the attribute of the received image in correspondence with the conversion degree determined by the quantifier.

In addition, the quantifier can be configured to provide a standardized quantity for an attribute to be manipulated, and the standardized quantity can be set to a value between 0 and 1.

Further, the image manipulation device can further include a quantifier training unit configured to train the quantifier to quantitatively express the conversion degree of the attribute. Also, the quantifier training unit can train the quantifier using a custom attribute dataset.

In an embodiment, the image generative AI model can include a generative adversarial networks (GAN) model, in which the GAN model can be configured to generate a face image, and the navigator can perform image manipulation by moving a quantity vector in correspondence with the conversion (change) degree of the attribute in a latent space of the GAN model, the conversion degree being determined by the quantifier.

Further, the navigator can be trained such that the quantity vector does not deviate from the latent space. The image manipulation device can further include a navigator training unit configured to move a quantity vector in the latent space and, when manipulation of the received image occurs according to the moving of the quantity vector, train the navigator according to a quantity change in the quantifier with respect to the manipulated image.

In addition, the navigator training unit can train the navigator so that a target quantity vector input through the quantifier matches an estimated quantity vector obtained by inversely estimating the quantity change in the quantifier through the image manipulation in the latent space. The quantifier can include a plurality of quantifiers in correspondence with a plurality of attributes to manipulate the plurality of attributes.

When requests for conversion of different attributes are received through the plurality of quantifiers, the navigator can manipulate the received image to reflect a plurality of received attributes. An embodiment of the present disclosure also provides a corresponding image manipulation method which includes training a quantifier to determine a conversion degree of an attribute of a received image; performing exploration in a latent space of an image generative artificial intelligence (AI) model to convert the attribute of the received image in correspondence with the conversion degree determined by the quantifier; and generating a manipulated image by converting the attribute of the received image on a basis of the conversion degree of the attribute, the conversion degree being determined by the quantifier, The training can include training the quantifier to quantitatively express the conversion degree of the attribute. Also the image generative AI model can include a generative adversarial networks (GAN) model, and the performing of the exploration can include performing image manipulation by moving a quantity vector in correspondence with the conversion (change) degree of the attribute in a latent space of the GAN model, the conversion degree being determined by the quantifier.

The image manipulation method can further include moving a quantity vector in the latent space and, when manipulation of the received image occurs according to the moving of the quantity vector, training the navigator according to a quantity change in the quantifier with respect to the manipulated image.

Advantages of the Present Disclosure

The present disclosure can provide a user-friendly quantitative manipulation model by expanding a GAN model, and a novel image manipulation device capable of performing fine but normalized control of manipulation of multiple attribute quantities.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

It is noted that the technical terms used herein are used only to describe specific embodiments and are not intended to limit the disclosure. In addition, a singular representation used herein can include a plural representation unless it represents a definitely different meaning from the context. In general, a suffix such as "module" and "unit" can be used to refer to elements or components. Use of such a suffix herein is merely intended to facilitate description of the specification, and the suffix itself is not intended to give any special meaning or function.

In the present disclosure, the terms "comprising" and "including" should not be construed to necessarily include all of the elements or steps disclosed herein, and should be construed not to include some of the elements or steps thereof, or should be construed to further include additional elements or steps. In addition, in describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. In addition, each of the embodiments described below, as well as combinations of embodiments, are changes, equivalents, or substitutes included in the spirit and technical scope of the present disclosure, and can fall within the spirit and technical scope of the present disclosure.

Figure 1:
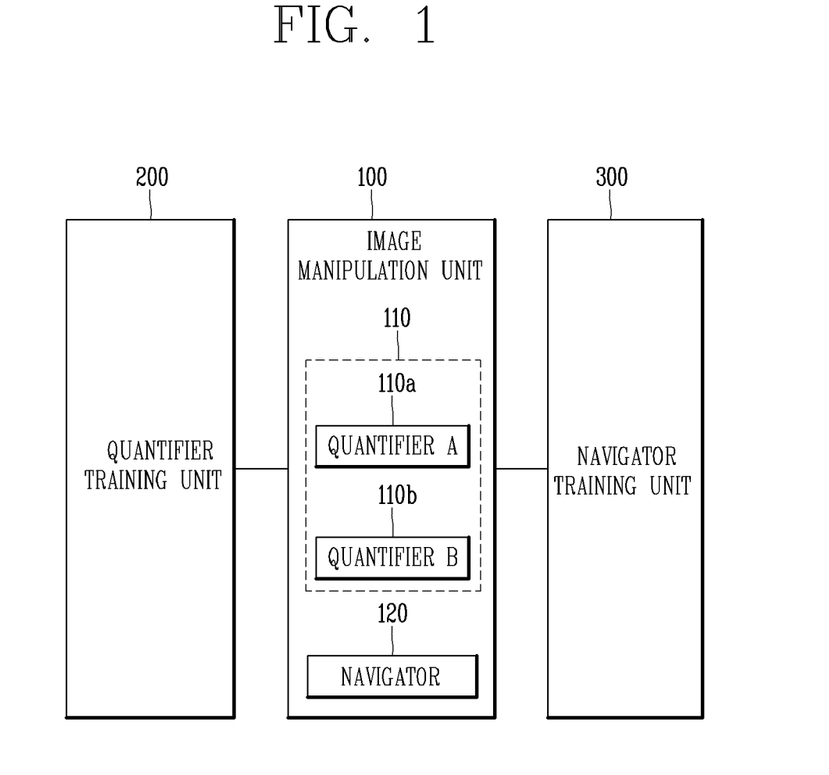
FIG. 1 is a conceptual diagram illustrating an image manipulation device according to an embodiment of the present disclosure.

Hereinafter, aforementioned configurations and operations in the present disclosure will be described in detail, with reference to a plurality of drawings relevant to the present disclosure. In particular, FIG. 1 is a conceptual diagram illustrating an image manipulation device according to an embodiment in the present disclosure. The image manipulation device in the present disclosure can include a computer, a terminal, a desktop personal computer (PC), a laptop computer, as well as a smartphone, a tablet PC, a cellular phone, a personal communication service (PCS) phone, a synchronous/asynchronous international mobile telecommunication (IMT)-2000 mobile terminal, a palm PC, a personal digital assistant (PDA), or the like.

In addition, the image manipulation device can communicate with a server configured to receive a request from a client to perform information processing. In addition, the image manipulation device according to an embodiment of the present disclosure can be a mobile terminal. The mobile terminal described herein can include a mobile phone, a smartphone, a laptop computer, a digital broadcasting terminal, a PDA, a portable multimedia player (PMP), a navigation system, a slate PC, a tablet PC, an ultrabook, a wearable device, e.g., a smartwatch, smart glasses, a head mounted display (HMD), or the like.

Hereinafter, in the present disclosure, terms, i.e., the image manipulation device and a computer (or a server) are to be used mixed with each other for convenience of description. In addition, an image manipulation method corresponds to a method of controlling the image manipulation device, and a method by the image manipulation device or the computer (or the server).

Referring to FIG. 1, the image manipulation device includes a quantifier unit 200, an image manipulation unit including a quantifier 110 and a navigator 120, and a navigator training unit 300. The quantifier 110 is configured to determine a conversion degree of an attribute of a received image, and the navigator 120 is configured to generate a manipulated image by converting the attribute of the received image based on the conversion degree determined by the quantifier 110. The quantifier 110 can be referred to as an attribute quantifier configured to determine (or estimate) a degree of an attribute (or a quantity of an attribute) to be edited.

Here, the attribute can include various attributes that can be converted or manipulated from an image. As an example, an attribute of a face can include an age, a facial expression, a hair style, eyeglasses, a beard, etc. A degree (a strength) of an attribute can be defined using a standardized quantity respectively for attributes of an image (an age, a facial expression, a hair style, eyeglasses, a beard, etc. for a face), In more detail, when an attribute to be adjusted and a target quantity for any input image (or a received image) are input, the image manipulation device can generate an image in which the attribute is changed corresponding to the target quantity. In this instance, the image manipulation device can automatically generate the image without having to perform, by a user, a process of viewing the input image or the generated image and determining a degree of the attribute.

To do so and as described above, the image manipulation device includes the quantifier 110 configured to measure a degree of an attribute of an image, and the navigator 120 (an explorer) configured to perform manipulation by exploring a latent space of an image generative artificial intelligence (AI) model based on the quantifier. The image generative AI model can include a generative adversarial networks (GAN) model, a vector auto-encoder (VAE) model, a diffusion model, etc.

Further, the image manipulation device according to an embodiment of the present disclosure can perform exploration into the latent space of the image generative AI model. Hereinafter, a method of operating the GAN model will be described.

The navigator 120 can perform exploration in the latent space of the GAN model to convert an attribute of an image to a degree determined by the quantifier 110. In addition, the quantifier 110 can be configured to provide a standardized quantity for an attribute to be manipulated. In more detail, the standardized quantity can be set to a value between 0 and 1. To do so, the image manipulation device can further include a quantifier training unit 200 configured to train the quantifier 110 to quantitatively express a conversion degree of an attribute. For example, the quantifier training unit 200 can train the quantifier 110 to define a standardized quantity for attribute manipulation using a small number of images.

Figure 3:
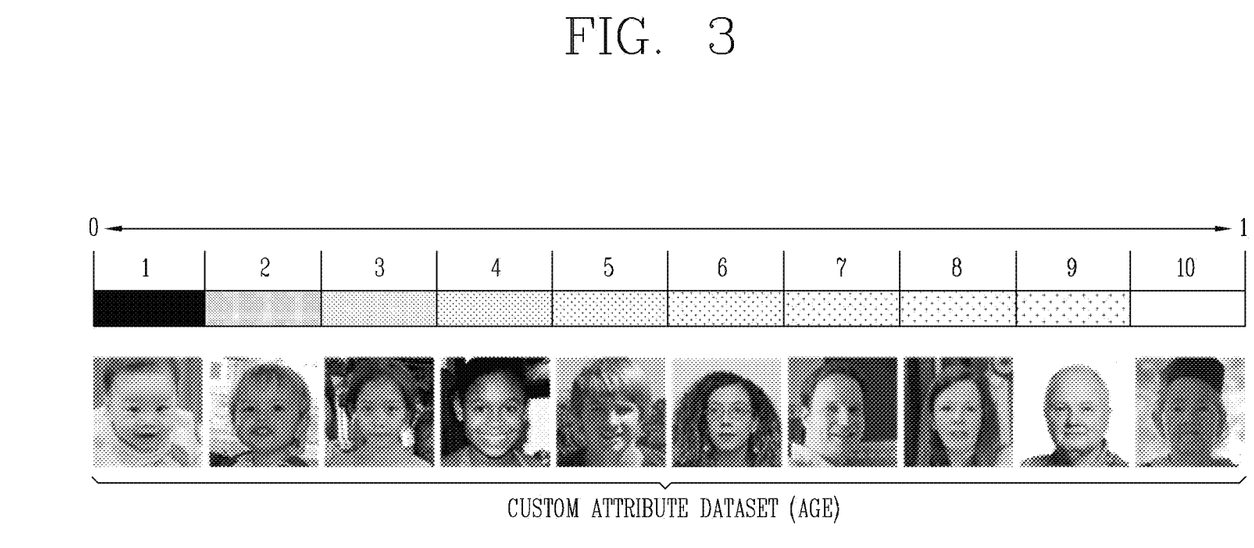
FIGS. 3 to 8 are conceptual diagrams illustrating the image manipulation method described with reference to FIG. 2.

As illustrated in FIG. 3, the quantifier training unit 200 can train the quantifier 110 using a custom attribute dataset, to perform training with respect to a particular attribute (for example, an age). That is, the quantifier training unit 200 can use the custom attribute dataset to define (or train) a standardized quantity with respect to a particular attribute (for example, an age) corresponding to the custom attribute dataset.

Then, the image manipulation device can receive an input of a target input value for the corresponding particular attribute as the standardized quantity, and receive an input of any image (or a received image) to generate an image having an attribute manipulated to a desired degree (a quantity, a size, or a value). For example, a user can select an attribute of a face to be manipulated (an age, a facial expression, etc.), divide the attribute into a plurality of classes (levels, steps, or phases) in a range from 0 to 1 (e.g., 4 to 10 classes) according to a degree of the attribute (or a strength of the attribute), and perform training using one or more custom attribute datasets (e.g., about 1 to 5 reference images) for each class.

For example, as illustrated in FIG. 3, when the quantifier 110 is trained for an attribute for an age, the quantifier training unit 200 can divide a range from 0 to 1 into 10 classes, and assign a custom attribute dataset according to ages to quantitatively express and assign a range and classes of manipulation with respect to an age attribute for a face. In this instance, the classes can be set to standardized quantities of values between 0 and 1.

In addition, the quantifier 110 can be trained to output a standardized quantity from an image. Further, the navigator 120 according to an embodiment of the present disclosure can perform exploration into a latent space of a GAN model to convert an attribute of an image to a degree (a quantity of an attribute to be converted) determined by the quantifier 110.

As an example, the GAN model included in the image manipulation device can generate (or manipulate) an image of a face. The navigator 120 can perform image manipulation by moving a quantity vector in a latent space of the GAN model to a conversion degree of an attribute determined by the quantifier. In this instance, the navigator 120 can be trained such that the quantity vectors do not deviate from the latent space.

Further, as shown in FIG. 1, the image manipulation device can further include a navigator training unit 300 configured to move a quantity vector in the latent space, and when manipulation of an image occurs according to the moving of the quantity vector, train the navigator 120 according to a quantity change in the quantifier with respect to the manipulated image. In addition, the navigator training unit 300 can train the navigator 120 so that a target quantity vector input through the quantifier 110 matches an estimated quantity vector obtained by inversely estimating a quantity change in the quantifier through the image manipulation in the latent space.

In more detail, in the image manipulation device, a phenomena can occur in an order from movement in the latent space, and change the occurrence in a received image to a quantity change in the quantifier according to the change in the received image. The navigator training unit 300 can thus train the navigator 120 using this correlation.

After the training, when a target quantity for an image to be inversely generated (manipulated) is input through the quantifier, the movement of a quantity vector in the latent space to generate manipulation can be performed by the navigator. By applying the movement of the quantity vector to the image, the image manipulation device according to an embodiment of the present disclosure can generate an image manipulated to have a desired target quantity.

Also, as illustrated in FIG. 1, the quantifier 110 in the image manipulation device can include a plurality of quantifiers 110a and 110b corresponding to a plurality of attributes to manipulate the plurality of attributes. In particular, the plurality of quantifiers 110a and 110b can be provided to manipulate different attributes, respectively, and each can be configured to provide a standardized quantity for a corresponding attribute.

When conversion requests for the different attributes are received through the plurality of quantifiers 110a and 110b, the navigator 120 can manipulate an image to reflect a plurality of received attributes together. For example, a request for conversion of a first attribute (e.g., an age) can be received through the first quantifier 110a, and a request for conversion of a second attribute (e.g., a beard) can be received through the second quantifier 110b together.

In this instance, the navigator 120 can convert attributes of received images together in correspondence with a degree to which the received first attribute is to be converted based on a standardized quantity provided by the first quantifier 110a, and a degree to which the received second attribute is to be converted based on a standardized quantity provided by the second quantifier 110b. Then, the navigator 120 can generate and output a manipulated image in which both the first and second attributes are reflected.

Figure 2:
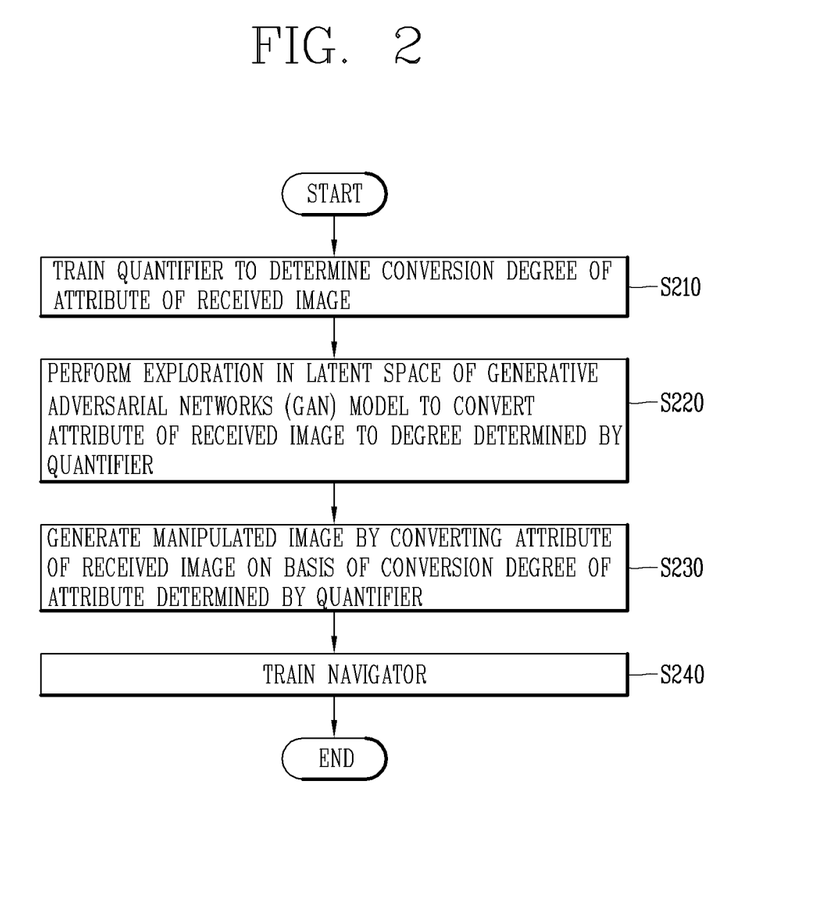
FIG. 2 is a flowchart illustrating an image manipulation method representative according to an embodiment of the present disclosure.

Next, FIG. 2 is a flowchart illustrating an image manipulation method representative in an embodiment of the present disclosure. As shown in FIG. 2, the image manipulation method (or a method of controlling the image manipulation device) includes training a quantifier to determine a conversion degree of an attribute of a received image (S210). Here, the training of the quantifier can include training the quantifier to quantitatively express the conversion degree of the attribute.

Then, the image manipulation method includes performing exploration in a latent space of a GAN model to convert the attribute of the received image to the conversion degree determined by the quantifier (S220). Here, the exploring can include moving a quantity vector corresponding to the conversion (change) degree of the attribute determined by the quantifier in the latent space of the GAN model to perform image manipulation.

Then, the image manipulation method can include generating a manipulated image by converting the attribute of the received image, based on the conversion degree of the attribute determined by the quantifier (S230). The image manipulation method can further include moving a quantity vector in the latent space, and when the image manipulation occurs according to the moving of the quantity vector, training the navigator according to a quantity change in the quantifier with respect to the manipulated image (S240).

In the present disclosure, an attribute can be quantitatively expressed and represented into a small number of images. Thus, an attribute to be manipulated from a user input can be defined by a quantity. In addition, an intervention by a user can be minimized by automatically applying a defined manipulation model into any face image, and an automation model can be utilized such that a user can easily define and use an image manipulation model in a virtual environment such as Metabus.

Also, because a degree to which an attribute is to be converted is input as a standardized quantity, a change of a face image according to a situation can be expressed into a function (e.g., a change in an age according to time progress, an emotional change of a character according to a situation).

Hereinafter, the image manipulation method in the present disclosure is described In more detail. In particular, FIGS. 3 to 8 are conceptual diagrams illustrating the image manipulation method described with reference to FIG. 2.

Figure 5:
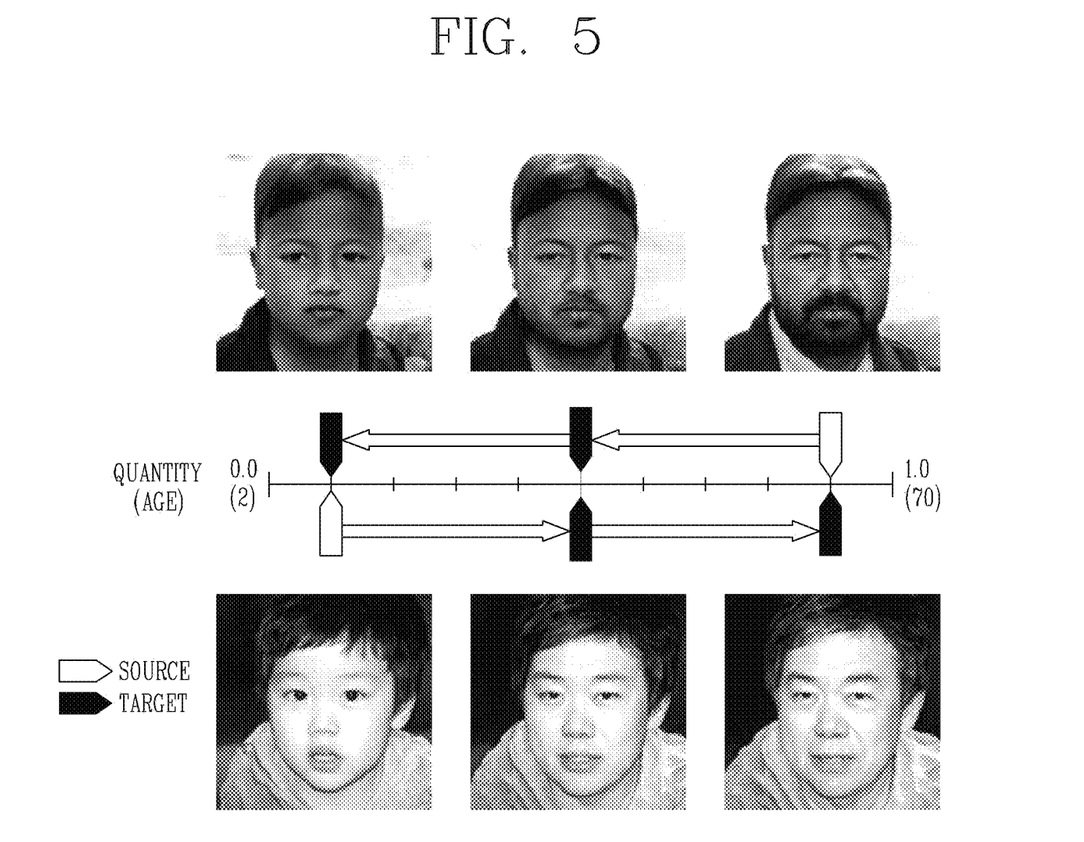

The image manipulation device according to an embodiment in the present disclosure can provide an interface capable of quantitatively manipulating a defined attribute that a user wants to manipulate, to achieve view consistency during image manipulation in a latent space. That is, as shown in FIG. 5, the image manipulation device can include a display displaying images and an interface for manipulating user desired attributes. As described above, the image manipulation device also includes the attribute quantifier 110 (or the quantifier) configured to estimate a quantity of an attribute to be edited, and the navigator 120 configured to explore a latent space to generate a manipulated image.

Because the attribute quantifier 110 guides the navigator 120, the manipulation quality of the navigator 120 can vary according to performance of the quantifier 110. An off-the-shelf regression model pre-trained for a particular attribute can be used for quantification. Particularly, it is not easy to construct a pre-trained quantifier, particularly for an uncommon user-defined attribute (property).

Thus, the navigator can manipulate an image by assigning only a target quantity without exploring a direction and scale of changes of latent features, to improve the treatment of a user-assigned attribute (an attribute to be manipulated by a user). For example, it is not easy to explicitly define an attribute expressed as a complex facial feature, such as tiredness.

Further, user-defined attributes can be assigned based on a small number of image samples to perform quantitative manipulation of objects according to state changes wanted by a user. The image manipulation device can thus perform latent space image manipulation.

In more detail, StyleGAN2 can generate realistic images in various styles by learning styles of dataset images, and allow effective manipulation as various attributes are disentangled. In one embodiment of the present disclosure, images can be accurately manipulated within a normalized range of attribute variation with a relatively small amount of labeled data. The image manipulation device can design a user-defined attribute quantifier configured to estimate normalized quantity of an image to provide user-friendly attribute handling, and design and provide a navigator configured to manipulate a user-defined attribute of an object for recognized image synthesis.

Figure 4:
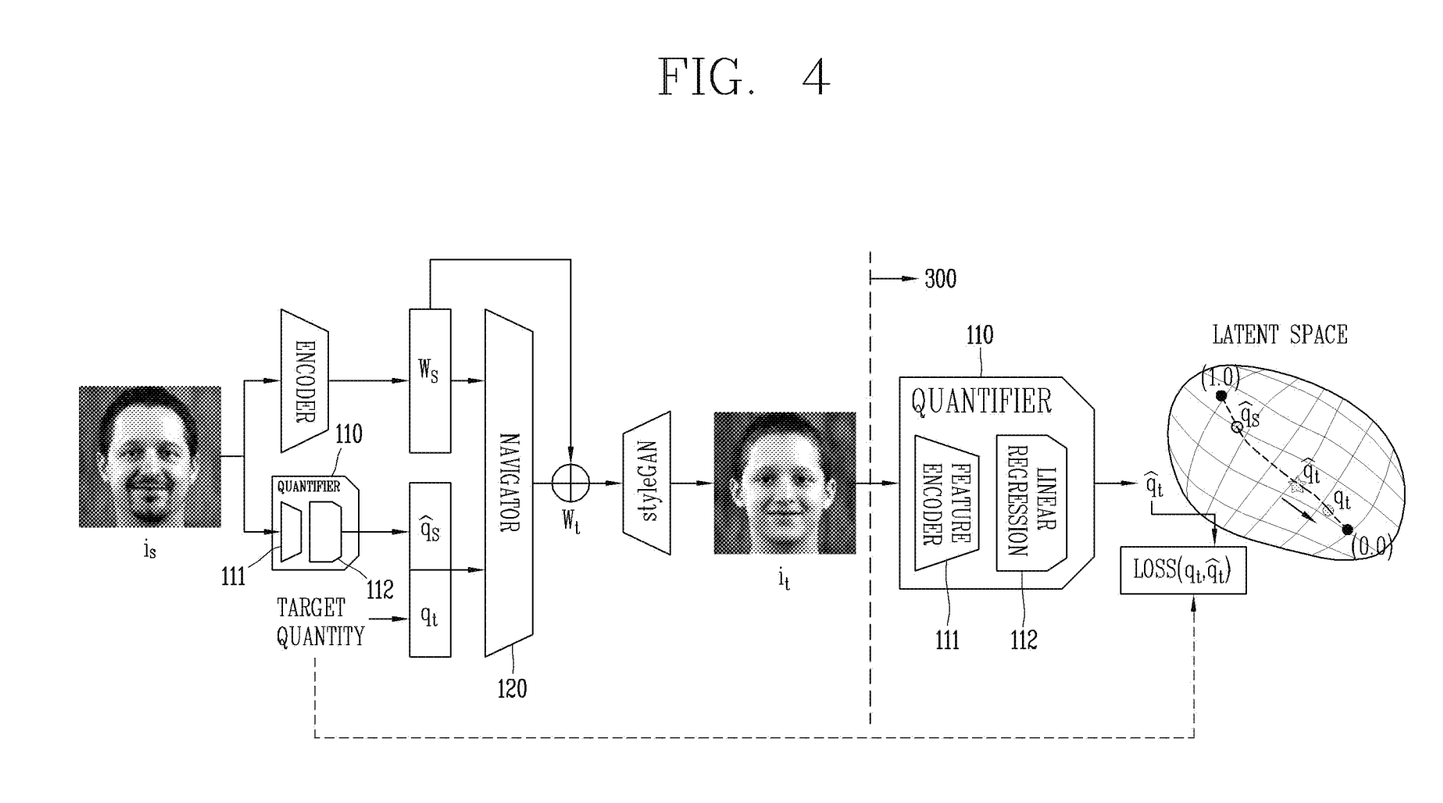

Referring to FIG. 4, the navigator can manipulate a latent feature in a latent space of an image generation model such as StyleGAN, etc. to receive a source image with a target attribute quantity, and generate a target image from the source image. The quantifier can estimate a source attribute quantity and a target attribute quantity both used for exploration, and a loss function during training of the navigator. The image manipulation device includes a quantifier configured to estimate a standardized quantity for an attribute of an image, and a navigator configured for user-friendly image manipulation.

Referring to FIG. 4, the quantifier can estimate a source attribute quantity $\hat{q}_s$ from a source image $i_s$. Here, the source attribute quantity $\hat{q}_s$ can be input to the navigator along with a target quantity $q_t$ in a standardized range of (0,1). An encoder can extract a source feature $w_s$ from the source image $i_s$.

The navigator can move the source feature $w_s$ to a target feature $w_t$ in the latent space with reference to the target quantity $q_t$ and the source attribute quantity $\hat{q}_s$. The target feature $w_t$ can be used as an input to the image generation model to yield a manipulated target image $i_t$. The quantifier can estimate the target attribute quantity $\hat{q}_t$ for the manipulated target image $i_t$ generated by the image generation model to train the navigator, The estimated target attribute quantity $\hat{q}_t$ can be used to form a loss for training the navigator.

The training can be performed by minimizing a loss (i.e., a squared error between the target quantity $\hat{q}_t$ and the target attribute quantity $\hat{q}_t$), and the trained navigator can manipulate the source image is to the target image $i_t$ having the given target quantity $q_t$. The quantifier can estimate the attribute quantity q from an image x. According to one embodiment of the present disclosure, the quantifier can standardize an attribute quantity label in a range of (0,1) to express various attributes on a normalized scale. According to one embodiment of the present disclosure, a training dataset D with a label quantity range of (0, 1) can be used to train the quantifier for a particular attribute. To assign quantity labels to images in the training dataset D, the label quantity range of (0, 1) can be equally divided into M groups, and the training dataset D can be divided into M groups in an order of attribute changes. Each of the M groups includes N images. In this instance, a quantity label for each image in an m-th group Gm in the training dataset D can be assigned to a quantified value of (m−½)/M.

Further, synthetic samples can be augmented using images in adjacent groups to mitigate lack of samples in the training dataset D. As an example, for an image augmented by combining an image in the m-th group Gm with an image in an m+1 group Gm+1 using a combination ratio λ, a corresponding quantity label can be assigned to (m+½−λ)/M. Since the combination ratio λ is sampled from a uniform distribution of (0, 1), densely quantified labels are sufficient to train the quantifier to yield any quantity in the range of (0, 1).

A structure of the quantifier includes a feature encoder and a linear regression model. A feature f can be extracted from the image x using a pre-trained feature encoder, and the attribute quantity q can be yielded from the feature f that is input through a linear regression model. The pre-trained image encoder can be used for a feature encoder. The linear regression model can include a fully connected layer, and can be trained by minimizing a mean squared error (MSE) loss between labels q and $\hat{q}$ when the feature encoder is frozen.

Further, the navigator can control an attribute change in a latent space according to a target attribute quantity given using the quantifier. According to one embodiment of the present disclosure, the navigator can manipulate a feature of changing a source feature $w_s$ to a target feature $w_t$ according to a guidance of a source attribute quantity $\hat{q}_s$ and a target quantity $q_t$ in a 512-dimensional latent vector space W+.

Pre-trained models can be used as an image generator configured to generate a target image $i_t$ from the target feature $w_t$ and an encoder configured to extract a source latent feature $w_s$ from the source image $i_s$. Each of scalar quantities, i.e., a source attribute quantity $\hat{q}_s$ and a target quantity $q_t$ can be converted into a 256-dimensional vector by repeating a scalar itself. A 1024-dimensional input vector generated by concatenating a source feature $w_s$, a source attribute quantity $\hat{q}_s$, and a target quantity $q_t$ can be fed to the navigator. Identity between the source image $i_s$ and the target image $i_t$ can be maintained using a residual connection from the source feature $w_s$ to a last layer.

To ensure that the navigator performs well within an entire range of (0, 1), the target quantity $q_t$ randomly sampled from a uniform distribution of (0, 1) can be used during training of the navigator. Hence, the navigator can be trained to move a source latent feature $w_s$ to a point in a latent space that represents an intermediate target quantity.

As illustrated in FIG. 5, the navigator can be trained to manipulate an image using the quantifier, and provide an interface for manipulating a target manipulation attribute through a standardized quantity between 0 and 1. In addition, as illustrated in FIG. 5, when a target quantity between 0 and 1 is fed into a source image, a manipulated image can be generated to have a degree of an attribute (a strength of an attribute) corresponding to the aforementioned target quantity. For example, FIG. 5 illustrates a display including sliders the user can use to change the quantity of the particular attribute (age in this example). Thus, as shown in FIG. 5, the user can use the slider to change the age attribute from young to old or from old to young, and the display displays the results of the image manipulated by the image manipulation device of the present disclosure.

Figure 6:
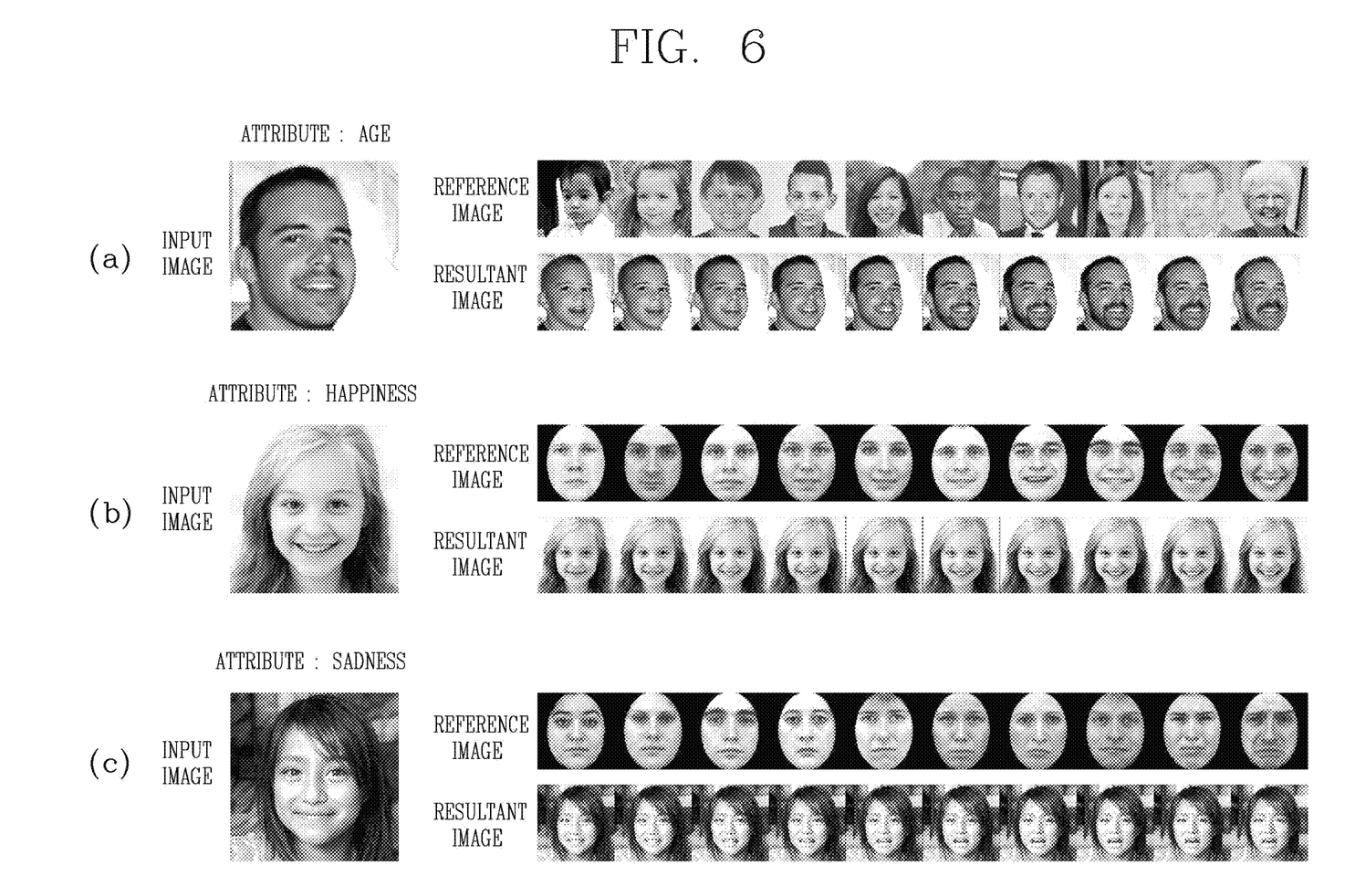
Figure 7:
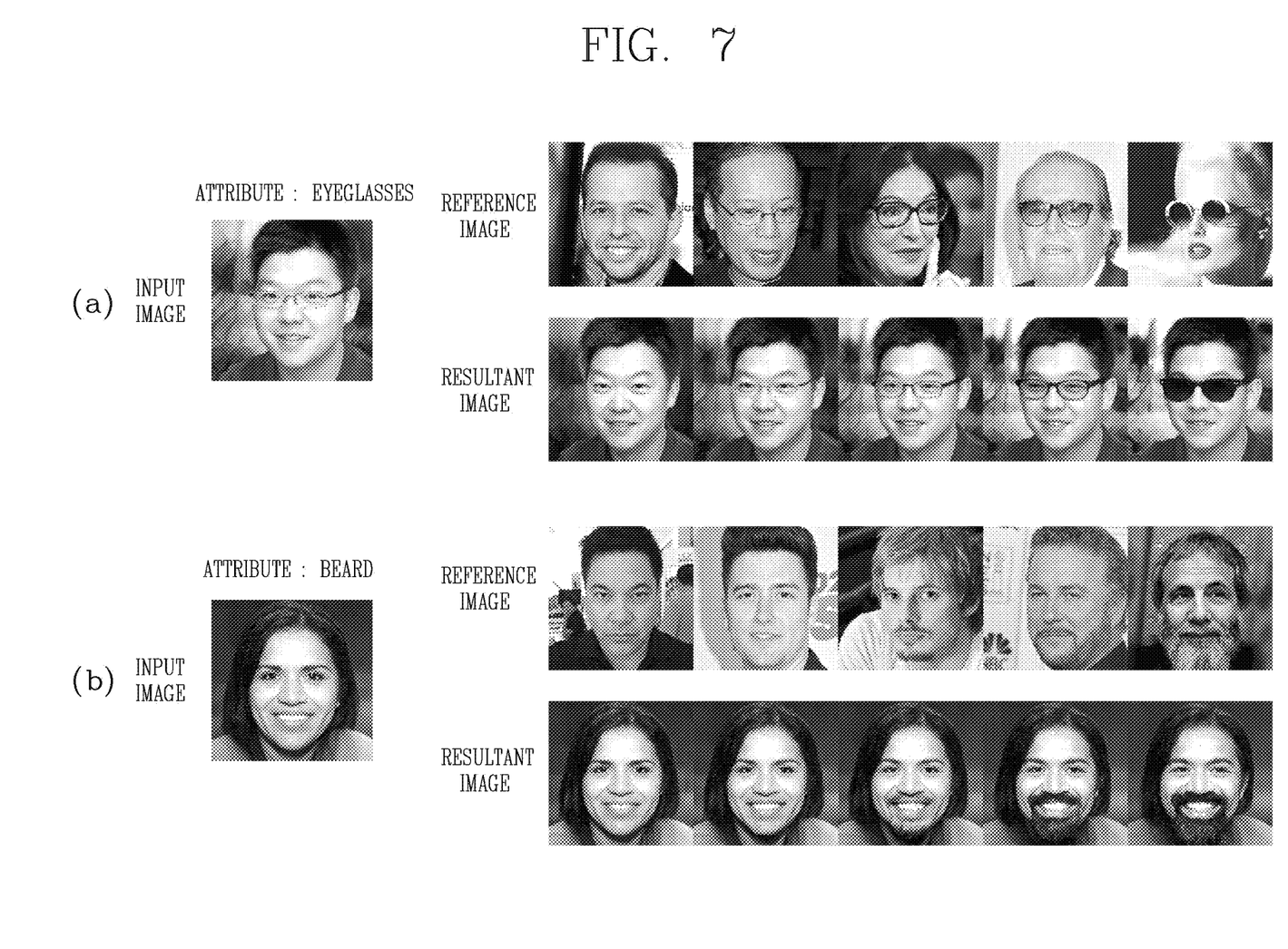

This attribute can include various attributes such as an age in (a), happiness in (b), and sadness (c) as illustrated in FIG. 6, and eyeglasses in (a) and a beard in (b) as illustrated in FIG. 7. A plurality of quantifiers can be included to respectively manipulate these different attributes. FIGS. 6 and 7 also illustrate the display displaying the result images of the image manipulated by the image manipulation device of the present disclosure.

Figure 8:
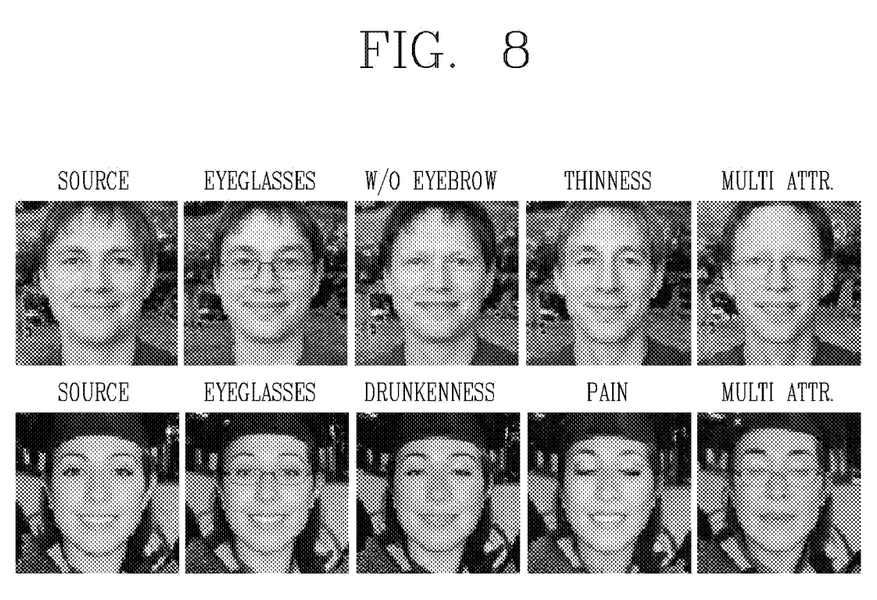

As illustrated in FIG. 8, when conversion requests with respect to different attributes are received through the plurality of quantifiers, the navigator 120 can manipulate an image to reflect the received attributes together. For example, FIG. 8 illustrates a display displaying different image manipulations in which eyeglasses are added to a source image, eyebrows are removed from a source image, the face of the user in the image is manipulated to be thinner, and an image in which multiple attributes are changed. As shown in the lower row of FIG. 8, the source image can also be manipulated to include different facial expressions such as drunkenness, pain, etc. A final image can also include multiple modified attributes.

The present disclosure can provide a user-friendly quantitative manipulation model by expanding a latest GAN model, and a novel image manipulation device capable of performing fine but normalized control of multiple attribute quantity while maintaining view consistency.

The above detailed description should not be limitedly construed in all aspects and should be considered as illustrative. The scope of the present disclosure should be determined by reasonable interpretation of the appended claims, and all changes within the scope of equivalents of the present disclosure are included in the scope of the present disclosure.

What is claimed is:

1. An image manipulation device comprising:
   an interface configured to receive an image;
   an encoder configured to transform the received image into a vector Ws;
   a quantifier configured to:
   output a source quantitative value Qs for the received image based on a training data set including a plurality of images arranged into classes, and
   receive a target quantitative value Qt different than the source quantitative value Qs;
   a navigator configured to:
   receive the source quantitative value Qs, target quantitative value Qt and the vector Ws, and
   output a vector Wt indicating a modified vector of the vector Ws based on the source quantitative value Qs and target quantitative value Qt;
   a decoder configured to decode the output vector Wt into a modified image It corresponding to a modification of the received image; and
   a display configured to display the modified image.

2. The image manipulation device of claim 1, further comprising:
   a memory configured to store the training dataset including a plurality of images corresponding to a particular attribute of the received image,
   wherein the training dataset includes a plurality of classes identifying different degrees of the particular attribute.

3. The image manipulation device of claim 2, wherein a first class of the plurality of classes identifies a first conversion degree of the particular attribute and a second class of the plurality of classes identifies a second conversion degree of the particular attribute.

4. The image manipulation device of claim 2, wherein the quantifier is configured to provide a standardized quantity for the particular attribute.

5. The image manipulation device of claim 4, wherein the standardized quantity includes a value between 0 and 1.

6. The image manipulation device of claim 1, wherein the quantifier is further configured to receive the modified image It and output a quantitative value $\hat{Q}t$.

7. The image manipulation device of claim 6, further comprising:
   a processor configured to calculate a difference between the quantitative value $\hat{Q}t$ and the quantitative value Qt,
   wherein the navigator is trained to minimize the difference between the quantitative value $\hat{Q}t$ and the quantitative value Qt using an AI model.

8. The image manipulation device of claim 1, wherein the quantifier comprises a plurality of quantifiers corresponding to a plurality of attributes to manipulate the plurality of attributes.

9. The image manipulation device of claim 8, wherein, when requests for conversion of different attributes are received through the plurality of quantifiers, the navigator manipulates the received image to reflect the plurality of received attributes.

10. An image manipulation method comprising:
    receiving, via an interface, an image;
    transforming, via an encoder, the received image into a vector Ws;
    outputting, via a quantifier, a source quantitative value Qs for the received image based on a training data set including a plurality of images arranged into classes;
    receiving, via the quantifier, a target quantitative value Qt different than the source quantitative value Qs;
    receiving, via a navigator, the source quantitative value Qs, target quantitative value Qt and the vector Ws;
    outputting, via the navigator, a vector Wt indicating a modified vector of the vector Ws based on the source quantitative value Qs and decoding, via a decoder, the output vector Wt into a modified image It corresponding to a modification of the received image; and displaying, via a display, the modified image.

11. The image manipulation method of claim 10, further comprising:

storing, via a memory, the training dataset including a plurality of images corresponding to a particular attribute of the received image, wherein the training dataset includes a plurality of classes identifying different degrees of the particular attribute.

12. The image manipulation method of claim 11, wherein a first class of the plurality of classes identifies a first conversion degree of the particular attribute and a second class of the plurality of classes identifies a second conversion degree of the particular attribute.

13. The image manipulation method of claim 11, further comprising:

providing, via the quantifier, a standardized quantity for the particular attribute.

14. The image manipulation method of claim 13, wherein the standardized quantity includes a value between 0 and 1.

15. The image manipulation method of claim 10, further comprising:

receiving, via the quantifier, the modified image It; and outputting, via the quantifier, a quantitative value $\hat{Q}t$.

16. The image manipulation method of claim 15, further comprising:

calculating, via a processor, a difference between the quantitative value $\hat{Q}t$ and the quantitative value Qt; and training, via the processor, the navigator to minimize the difference between the quantitative value $\hat{Q}t$ and the quantitative value Qt using an AI model.

17. The image manipulation method of claim 10, wherein the quantifier comprises a plurality of quantifiers corresponding to a plurality of attributes to manipulate the plurality of attributes.

18. The image manipulation method of claim 17, wherein, when requests for conversion of different attributes are received through the plurality of quantifiers, the method further comprises manipulating, via the navigator, the received image to reflect the plurality of received attributes.

* * * * *